April 1, 1969     D. J. McSWEENEY ET AL     3,436,186
TEST METHOD FOR ASSESSING OVULATORY FUNCTION
Filed Feb. 21, 1964
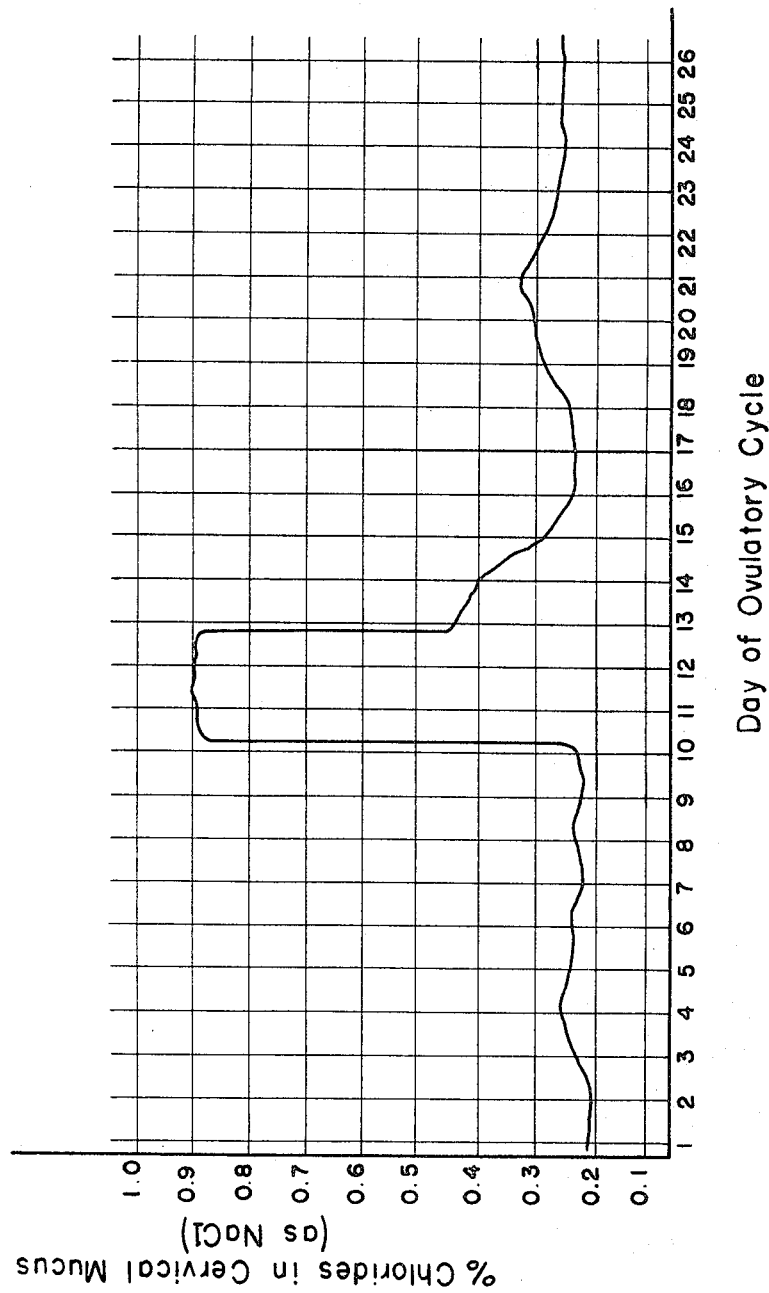
Inventors
Daniel J. McSweeney
Anthony J. Sbarra
*Gordon W. Hueschen*
ATT'Y

3,436,186
TEST METHOD FOR ASSESSING OVULATORY FUNCTION
Daniel J. McSweeney and Anthony J. Sbarra, Milton, Mass., assignors to Consolidated Laboratories, Inc., Chicago Heights, Ill., a corporation of Illinois
Filed Feb. 21, 1964, Ser. No. 346,475
Int. Cl. G01n *31/00*
U.S. Cl. 23—230                    16 Claims

ABSTRACT OF THE DISCLOSURE

Diagnostic test method for determining ovulatory function which comprises withdrawing a sample of a body fluid selected from cervical, nasal, and salivary mucus in which the chloride ion concentration is related to ovulatory function, and determining the chloride ion concentration of said body fluid as an indicator of the state of the ovulatory function at that time.

---

The present invention relates to biological testing and is more particularly concerned with a test method for determining ovulatory function, and especially the ovulation period and time of ovulation of human females.

Many tests have already been devised for determining the course of the menstrual cycle, more specifically the time of ovulation. Some of these are the glucose test, the so-called basal body temperature curve, the vaginal smear, the endometrial biopsy, the bioassay of the hormone excretion in the urine, and the "fern" test of the cervical mucus. None has gained wide acceptance, and a simple, economical and reliable routine test for ovulatory function would therefore be highly desirable.

Since the work of Seguy and Simmonet (Gynec. et Obst. 28.657, 1933) it has been known that there are cyclic physiochemical changes in the cervical mucus of normal menstruating women. This topic is reviewed in the report by Hartman (Ann. N.Y. Acad. Sci. 97:564, 1962). These changes result principally from the influence of estrogen and essentially render the cervical mucus more receptive to the spermatozoa at the time of ovulation. The determination of the time of ovulation has significance because the duration of susceptibility to fertilization of the ovum is relatively short. Sturgis and Pommerenke compiled estimates of this period of functional life varying from a few minutes to 72 hours (Fertility and Sterility 1:113, 1950). A comprehensive statistical analysis by Tietze (Fertility and Sterility 11:485, 1960) indicated that fertility exists only during a 12 to 24 hour period per ovulatory cycle.

In a typical ovulatory cycle in the human, the first day of menses would be arbitrarily considered the first day of the ovulatory cycle. The end of the menstrual period is followed by a proliferative phase of estrogen stimulation which culminates in ovulation on or about the fourteenth day following the first day of the cycle. Following ovulation there occurs the so-called secretory phase which results from progesterone and estrogen stimulation.

Birnberg, Jurzrok, and Laufer (J.A.M.A., 166:1174, 1958) developed a test for glucose to determine the period during the menstrual cycle when ovulation occurred. This test was based on the observation that the concentration of glucose tends to increase just prior to ovulation and reach a peak at ovulation. In this test, when paper strips are impregnated with glucose oxidase and a suitable indicator and the impregnated strip brought into contact with the cervical mucus, a color change occurs indicating the presence of a minimal concentration of glucose.

Investigation by Siegler (Am. J. Obst. and Gynec., 79:1169, 1960) showed that there was no phasic tendency or consistent alteration in the intensity of the color reaction for glucose which could pinpoint the time of ovulation. Siegler in 1960 (Am. J. Obst. and Gynec., 79:1169, 1960) found that there was no definite relation between the color reaction for glucose and either the basal body temperature or the phase of the endometrium as determined by biopsy. In addition, the glucose tests were found to be positive in the preovular and progestational phases of the cycle and occasionally negative during the thermal shift.

In 1959 Salvaggio (Harper Hospital Bull., 17:118, 1959) performed a study in which a number of tests, presumably indicative of ovulation time, were used to determine ovulation and concluded that the glucose test was not sufficiently reliable for practical use in determining the time of ovulation. Thus, because of its predictable unreliability, the glucose test has lost considerable favor.

A number of studies have revealed that an incremental rise in basal body temperature is associated with ovulation. The basal temperature chart is an accurate method but usually requires an uninterrupted night's sleep and the temperature must be taken daily at similar periods and under similar circumstances. Because of the rigidity of the schedule that must be adhered to, the use of body temperature as a routine criterion of ovulation time is impractical.

Vaginal smears to study ovulation are taken from the upper one-third of the lateral wall of the vagina and may be stained according to the Papanicolaou technique (Am J. Anatomy, 52:519, 1933). During the proliferative phase of the cycle, there is a progressive increase in the number of cornified cells. At ovulation the smear consists almost wholly of flat cornified cells with pyknotic nuclei. After ovulation, in the secretory phase under the influence of progesterone, the cells tend to curl and clump and there appear numerous leukocytes. The cornified cells decrease in number and the intermediate cells predominate. Cytological examination of vaginal smears thus may serve to indicate various clinical changes during the ovulatory cycle (Am. J. Obs. & Gynec., 51:316, 1946; Amer. J. Anat., 52 (suppl.); 519–637, 1933).

In the use of the endometrial biopsy, specimens are taken from the endometrium with a special type of curette and are then processed and examined under the microscope by the pathologist. In the proliferative phase the glands are mostly straight and there is no evidence of secretion into the gland lumen. After ovulation the glands are more tortuous and are dilated at the base and there is evidence of secretion. Toward the end of an ovulatory cycle, the glands become more dilated, their edges "saw-toothed," and secretory products occur in the lumen of the glands (Hertig, Arthur T., "Diagnosing the Endometrial Biopsy," in Conference on Diagnosis in Sterility, pp. 93–128, E. T. Engle (ed.); Charles C. Thomas, Springfield Ill., 1946).

Hormonal alterations in patients may also be determined by biological assays utilizing the patient's body fluids. For example, the Farris rat ovarian hyperemia test is performed by injection of a patient's urine into immature rats. When pituitary ganadotropic hormones are present, a marked hyperemia of the ovary occurs within a two-hour period. The blushing of the ovary is enhanced if the animal is killed with carbon monoxide gas, which keeps the blood a bright red. (Farris, E. J., "The Prediction of the Day of Human Ovulation by the Rat Test as Confirmed by Fifty Conceptuses," Amer. J. Obst. and Gynec., 56:347–352, 1948).

Papinicolaou (Am. J. Obst. and Gynec., 51:316, 1946) is generally credited with the first observation that the cervical mucus, when allowed to dry on a glass slide, forms a leafy or "fern" pattern during ovulation. After ovulation, progesterone exerts an inhibitory effect on the production of the amount and on the fern reaction of cervical mucus, as noted by Bergman (Fertil. and Steril., 4:183, 1953. Moricord in 1936 (Bull. Soc. d'Obst. et de Gynec., 25:426, 1936) showed that by giving estrogen to women, the production of cervical mucus and the degree of fern pattern were increased.

Ryberg (Acta Obst. and Gynec. Scandinav., 28:172, 1948) described such a leafy pattern ("fern") formation as being produced by cervical mucus at ovulation, with little or no fern pattern just before the menstrual flow. He deduced that these crystals were sodium chloride and that the fern reaction required the concomitant presence of sodium chloride with "mucin-like" substances. This deduction was substantiated by the observation of Landerstrom-Lang, a co-worker of Ryberg, who found crystal-like fern formation similar to that seen in cervical mucus when a solution of native egg-albumin in aqueous 0.9% sodium chloride dried on a slide. Ryberg also found the salt concentration in the cervical mucus near ovulation to be almost 97% sodium chloride. He found the fern reaction to be absent during pregnancy and at the menopause but, by administering estrogen to menopausal women, he was able to make the fern pattern appear.

Campos de Paz (Am. J. Obst. and Gynec. Supp. 61A: 790, 1951) reported that the cervical mucus was unfavorable to sperm penetration unless it gave the fern reaction.

A brief description of the performance of the fern test, as taken from Roland (Anals of the New York Academy of Sciences, 97:599, 1962) follows:

"With a bivalve speculum in the vagina, the cervix is exposed and cleaned with cotton balls. A long, narrow forceps that is partially hollowed out at the tip is inserted into the middle portion of the cervical canal, and mucus is collected between the cupped blades and spread on a clean, dry glass slide (FIGURE 2). It is important not to traumatize the cervix since the presence of blood inhibits proper ferning. The slide is allowed to dry (it may be gently heated) and is examined microscopically under low and high magnification."

Zondek and Rozin (Obst. and Gynec. 3:463, 1954) outline the characteristics of the "fern" reaction as follows:

"The fern reaction can occur in mucus secretions of the body other than those of the cervical mucus. The reaction requires the presence of proteins or their catabolic products with the concomitant presence of certain electrolytes such as sodium chloride, potassium chloride, and potassium bromide. Salts are considered indispensable for the fern reaction test in that dialyzed cervical mucus thus freed of salts gives a negative reaction which can be made positive by remixing the dialysate with the mucus."

In cases of primary amenorrhea, after castration, and during the menopause, there is no crystallization of salts sufficient to produce the fern reaction because of the lack of estrogen stimulation. However, in these cases the cervix can be stimulated by estrogen to produce salts, principally chlorides, with appearance of the fern reaction. During pregnancy the cervical mucus is devoid of chlorides because the cervical cells no longer permit the permeation of electrolytes either because of the effect of progesterone or some other factor peculiar to the pregnant state. During a normal pregnancy, the administration of estrogen will not cause appearance of the fern reaction. Zondek et al. (Fert. and Steril., 6:523, 1955) presented evidence to show that in a pregnancy wherein the cervical mucus exhibits some degree of fern reaction, in other words, in a pregnancy wherein electrolytes are present concurrently with the mucus, there is probable placental insufficiency and the patient may abort.

The foregoing evidence has demonstrated that the fern test, as noted when a smear of cervical mucus is allowed to dry on a glass slide and examined under the microscope, may be valuable in the diagnosis of many conditions related to gonadal hormonal activity in women. This so-called fern test has been found helpful in the study of ovulation, primary amenorrhea, the menopause in pregnancy, abortion, and other obstetrical and gynecological conditions. The fern test is, however, oftentimes difficult to interpret because of the difficulty of distinguishing between typical and atypical reactions. In addition, it does not readily lend itself to routine use because of the laborious nature of the test itself.

It is an object of the present invention to provide a reliable test method for determining the ovulatory function, and particularly for determining ovulation period and time. It is a further object to provide such a test method which is relatively simple and economical and which does not require extensive laboratory equipment for its utilization. It is an additional object to provide a reliable method for detecting abnormalities of the ovulatory cycle. Additional objects will be apparent to one skilled in the art and still others will become apparent hereinafter.

It has now been found that the various aspects of the ovulatory function are accompanied by relatively large changes in the chloride ion content of various body fluids, for example, cervical, or nasal mucus. It has further been found that the ovulation period is accompanied by a marked increase in chloride ion content of these body fluids.

An example (see Example 13) of a typical series of reactions using the test described herein is depicted by the figure. Using calcium alginate swabs and the test reagents here described, the degree of chloride precipitated when compared to a standard color curve showed fairly level amounts of chlorides, usually between 0.1 and 0.5% as sodium chloride, during the first ten days of the ovulatory cycle, followed by a sudden sharp peak of approximately 0.8 to 0.9% chlorides, which then decreases to the normal value and remains as such in a normal individual until the next period of ovulation.

The figure thus depicts a usual ovulatory cycle in which a sudden peak in increase of chloride ions occurs at the period of ovulation.

Accordingly, it has been found that a body fluid smear, such as of cervical mucus, when applied to a suitable chloride ion content indicating medium such as an indicating paper, is an accurate indication of the course of the ovulatory cycle, and in particular an indication of ovulation period and time. Moreover, it has been found that the tests may be utilized to detect normal and abnormal pregnancies, as well as abnormalities of the ovulatory function.

A suitable test reagent devised for the determination of chloride concentrations according to the present invention may be prepared as follows:

Preparation 1.—Circular filter paper sheets of eleven centimeters diameter are dipped into a suitable concentration of a solution of silver nitrate and placed on a piece of clean blotting paper to permit the excess silver nitrate solution to run off. The silver nitrate-impregnated sheet is now dipped into a solution of a suitable concentration of potassium chromate, which precipitates brownish-red silver chromate on the filter paper sheet. The test sheets are dried, preferably in a hot-air oven at about 107° C., for approximately ten to fifteen minutes, after which they are ready for use.

It is also possible to apply the silver chromate precipitate by suspending the silver chromate in a suitable vehicle which may be rolled or printed onto a filter paper sheet, the precipitate when dried also being suitable for the performance of this chloride test. Other suitable preparations are:

Preparation 2.—75 ml. of an 0.25 N silver nitrate solution is mixed with 25 ml. of an 0.25 N potassium chromate solution which results in a precipitate of silver chromate. The total precipitate is recovered with filter paper after filtering of the supernatant, and the precipitate then added to approximately 15 ml. of a 3% by weight dispersion of cellulose in distilled water. This suspension of chromate in the cellulose aqueous vehicle is now thoroughly mixed by blending and can be rolled or printed onto a filter paper sheet.

Preparation 3.—The precipitate of silver chromate, as described in Preparation 2, may also be dispersed in 15 ml. of a 15% aqueous solution of a polyvinyl alcohol synthetic resin (e.g., Du Pont "Elvanol," Grade 50–42). This suspension of silver chromate in the polyvinyl alcohol resin may be applied to paper by rolling or printing.

Preparation 4.—75 ml. of an 0.25 N silver nitrate solution is mixed with 25 ml. of an 0.25 N potassium chromate solution which results in a precipitate of silver chromate. The resulting solution with precipitate is permitted to stand for two to three hours, 50 ml. of the clear supernatant withdrawn by pipette or decanting, and the rest of the suspension thoroughly mixed and sprayed onto sheets of filter paper. The filter paper thus treated, when dried, is also suitable for the performance of this chloride test.

Although other silver salts such as silver acetate and silver chlorate have been found to be suitable, in reaction with other salts of chromium such as sodium dichromate, potassium dichromate, and sodium chromate, the essential methodology in use and performance of the test does not change.

In performing the test, a smear of the cervical mucus is taken directly from the cervical canal with a swab such as a cotton or calcium alginate swab, and rubbed on the test paper.

Alginate, e.g., calcium alginate, swabs are definitely superior to cotton swabs for this purpose, i.e., the performance of the test, all other factors being equal. For reasons which are not fully understood, the resultant spot on the test paper using an alginate swab, appears cleaner or smoother and gives enhanced contrast for easier interpretation of the test.

If the patient is taking smears daily during the intermenstruum, it is desirable to use a swab-tipped plunger encased in a cylinder of cardboard or plastic. The cylinder is introduced well up into the vagina, the plunger is pushed up to the cervix for the specimen of mucus and then withdrawn into the cylinder again before the whole device is removed. This has the advantage of not contaminating the swab with mucus or other substances which may be present in and around the vaginal orifice. After removal, the plunger is pushed upward again to expose the swab tip, which is then rubbed gently over an area of about two centimeters on the treated test paper. The patient takes smears every day or every few days of her cycle from the end of one menses to the beginning of the next. Thus, estrogenic activity followed by progestational activity is noted according to the changes observed on the paper.

Chloride ions of the smear react with silver ions of the silver chromate precipitate, displacing the chromate ions and resulting in a white silver chloride precipitate. The white silver chloride precipitate is in sharp color contrast to the reddish-brown background of silver chromate. The magnitude of the silver chloride precipitate, and hence the intensity of the white precipitate that results, is in proportion to the amount of chloride ions present in the specimen rubbed or streaked onto the test paper. Thus, by dipping a swab stick into a graded series of concentrations of sodium chloride and by comparing the intensities of the silver chloride precipitates formed with a cervical mucus specimen, it is possible to semi-quantitatively relate chloride ion concentration of a specimen of cervical mucus taken at any stage of the ovulatory cycle against a standard series.

Hitherto no data has been presented which would consider or suggest using solely the chloride content of the cervical mucus as a test for ovulatory and related hormonal functions. In addition, no studies are known to have been reported which quantitatively relate the chloride content of the cervical mucus or other body fluid directly to alterations produced during a normal or abnormal ovulatory cycle.

The following examples are given by way of illustration only and are not to be construed as limiting.

EXAMPLE 1

A cervical smear for chlorides, performed as already described hereinbefore, was performed on a patient, age 41. The smear was taken on the 12th day of the cycle, which usually varied in this patient from 29 to 32 days. The chloride test showed approximately 0.5% chlorides as sodium chloride; the fern test was 1+ with only occasional ferning observed on a smear which was mostly cellular. A vaginal smear showed an early proliferative phase with about 30% cornified cells, suggesting a low estrogen effect. The chloride test was confirmed, therefore, by the fern test and the vaginal smear.

EXAMPLE 2

A patient, age 22, reported one year of apparent infertility. In order to determine whether this patient ovulated, she was instructed to take a cervical mucus test for chlorides, as described herein, performing these tests daily at home from the end of one menses to the beginning of the next. The chloride test results showed a maximum intensity of the reaction on the 10th day with a definite drop in intensity of the chloride test on the 11th day, indicating a height of estrogen production and therefore a probable time of ovulation of the 10th day followed by a drop in chloride concentration and a presumable effect of progesterone on the 11th day. These data showed a definite ovulation time on the 10th day of a 24-day cycle.

EXAMPLE 3

A patient, age 37, had been married five years with no pregnancies. Clinical examination showed a large fibroid uterus. A mear was taken for chlorides on the 14th day of a 28-day cycle to determine probable ovulation. The chloride smear on the 14th day showed a very intense stain of approximately .9% chlorides suggesting high estrogen production, which indicated either imminent or actual ovulation. These data were confirmed by a 3+ fern test and a vaginal smear taken at the same time which showed 90% cornified cells. These data would suggest that the lack of ovulation would not in itself be the explanation for infertility in this patient.

EXAMPLE 4

A patient, age 44, was being examined for possible menorrhagia. The following tests were made to determine if she was ovulating. Cervical mucus smears using the chloride test were made on the 25th day of the 30-day cycle which was regular in this patient. The chloride test gave a very weak reaction, showing estrogen deficiency or an increased progesterone effect. The fern test was negative. A vaginal smear indicated a progesterone reaction, corroborating the progesterone effect indicated by the chloride test. It was therefore concluded that the patient had ovulated and that the menorrhagia was not due to anovulation.

EXAMPLE 5

A patient, age 24, had amenorrhea for two months but no previous irregularities in menses. There was no record of previous pregnancy. Clinical examination showed presumptive signs of pregnancy (soft cervix, slight uterine enlargement). A chloride smear of the cervical mucus showed practically no reaction, the fern test was negative, and the vaginal smear was positive for pregnancy since it showed a good progesterone effect. The chloride test, therefore, which indicated a stable pregnancy, was substantiated by the fern test and vaginal smear and the pregnancy was further confirmed by conventional biologic testing.

EXAMPLE 6

A patient, age 46, had a history of six full-term pregnancies and one miscarriage. The last menstrual period had been seven weeks previous to examination. The patient reported that her menstrual cycle was usually every 28 days. The chloride test on the cervical mucus showed approximately 0.5% chlorides, suggesting a low progesterone effect. This chloride reaction was confirmed by a 1+ fern test and a vaginal smear showing a progesterone deficiency. As a result of these tests the pregnancy was considered unstable since it would have been expected that the chloride test should have been higher in a stable pregnancy. The patient absorted spontaneously three weeks after the chloride test and the pathology report indicated a "blighted ovum."

EXAMPLE 7

A patient, age 51, had a history of amenorrhea for ten months. She complained of hot flashes and dizzy spells and the test was made to determine estrogen deficiency at menopause. The chloride test using cervical mucus showed a very slight chloride percentage, indicating estrogen deficiency. This was substantiated by a negative fern test and a vaginal smear showing 90% precornified cells and 10% parabasals, with no cornified cells.

EXAMPLE 8

A patient, age 54, complained of headaches, sweats, hot flashes, and nervousness. This patient was a menopausal case on whom previous vaginal smears had indicated estrogen deficiency. The chloride test taken on the cervical mucus 17 days after estrogen therapy (1.25 mg. Premarin—natural orally-active water-soluble estrogen-Ayerst—daily) showed a level of 0.3% chlorides. The fern test was 1+ and the vaginal smear showed 30% cornification. The results of the chloride test clearly were consistent with the vaginal smear and fern test results and served as a criterion of the effect of estrogen therapy.

EXAMPLE 9

A patient, age 34, complained of profuse prolonged menses with gross irregularity. A smear of cervical mucus for chloride reaction was taken to determine if the condition might be caused by uninterrupted estrogen stimulation. Chloride test on the 16th day of cycle showed intense staining (over 0.8%) from a high chloride percentage (hyperestrinism) indicating high estrogen elaboration. The fern test was 3+ and the vaginal smear showed 80% cornified cells. The chloride test was confirmed by the positive fern test. Diagnosis of hyperestrinism with probable anovulation was made.

EXAMPLE 10

A patient, age 35, was examined using cervical as well as nasal mucosa smears with calcium alginate swabs in order to determine the day during the ovulatory cycle at which a peak chloride reaction was found. The patient had a 24-day cycle and, on the 12th day, both the cervical and nasal smears showed a marked reaction by the chloride test of approximately 0.85% chlorides as sodium chloride. This determination indicated that the chloride ion concentration of the nasal mucosa was as effective as that of the cervical mucus and indicated the period of ovulation.

EXAMPLE 11

A patient, IB, age 40, was examined in the same way as the patient in Example 10. This patient had a 28-day cycle and both the nasal and cervical mucus chloride reactions on the test sheets showed peak reactions at the 14th day of the ovulatory cycle, again indicating the feasibility of utilizing either the nasal or cervical mucus for this test.

EXAMPLE 12

Two patients, IS and RP, ages 22 and 24 respectively, were studied using nasal and cervical mucus smears in order to determine if any false positive reaction of the nasal mucus would occur on days other than the day of ovulation. It was found that the intensity of the chloride reaction of the nasal mucosa paralleled that of the cervical mucus during that portion of the anovulatory cycle.

EXAMPLE 13

In the manner of the preceding examples, the results of the chloride test performed on the cervical mucus of a patient over a 26-day period were as follows:

| Day | Percent chlorides (as NaCl) | Day | Percent chlorides (as NaCl) |
|---|---|---|---|
| 1 | .2 | 14 | .4 |
| 2 | .2 | 15 | .35 |
| 3 | .2+ | 16 | .25 |
| 4 | .2+ | 17 | .2+ |
| 5 | .2+ | 18 | .2+ |
| 6 | .2+ | 19 | .25 |
| 7 | .2 | 20 | .25+ |
| 8 | .2+ | 21 | .3 |
| 9 | .2+ | 22 | .25+ |
| 10 | .25 | 23 | .25+ |
| 11 | *.85 | 24 | .25 |
| 12 | *.85 | 25 | .25 |
| 13 | .45 | 26 | .25 |

As indicated by the asterisks, the sudden peak in increase of chloride ions occurs at the period of ovulation, in this case on or about the eleventh day. This series of test results is illustrated diagrammatically in FIGURE 1.

The foregoing examples are representative of over 400 clinical cases utilizing the chloride test method described herein. The cumulative evidence all supports the conclusions that.

(a) The maximum intensity indicative of a sodium chloride concentration of about 0.85% was observed at or about the time of probable ovulation.

(b) About four days before ovulation the intensity of the stain paralleled 0.5% of sodium chloride and increased rapidly to at least about 0.8%, usually to approximately 0.85%. After ovulation there was a rapid fall to approximately 0.5% within four days and a very faint or no reaction just prior to menstruation.

(c) When sequential tests were made in the intermenstrum, an intense stain followed in four days by a considerably diminished stain was proof that ovulation had occurred.

(d) In cases of anovulatory cycles, there was no apparent drop in chloride concentration until just prior to menstruation. In many of these cases the chloride concentration remained high, around 0.85%, suggesting hyperestrinism. These latter cases were usually in the over-40 age group.

(e) Pregnancy invariably showed a lack of reaction in the chloride test, e.g., on the chloride test paper. If a test were carried out at the time of ovulation and another more than two weeks later, the test would in general be positive for pregnancy before a biologic test could be reliably resorted to.

(f) In cases of known pregnancy, a test result showing a fair degree of sodium chloride (about 0.5% or more) would indicate a probable unstable pregnancy. Administration of stilbestrol, 5.0 mg. daily, for two weeks to these patients would be followed by a diminution in the chloride concentration if the pregnancy were salvable and an increase in the reaction if an abortion were inevitable.

(g) There was less than 0.5% chloride (as sodium chloride) in the specimens of cervical mucus at the menopause and in castrated women. Administration of estrogen to these patients caused an increase in the concentration of chlorides as sodium chloride.

Since, as described above, chloride ion concentrations of at least about .8% or higher are indicative of the ovulation period, while lower concentrations such as .5% or less are indicative of periods outside the ovulation period, it is obviously necessary to have an indicating test means which accurately distinguishes the various concentrations over at least this range.

In order to determine the optimum proportions that would give a weak reaction with concentrations of sodium chloride less than about .8% and a bright peak reaction at concentrations of approximately .85% or slightly higher, indicator papers utilizing varying concentrations of silver nitrate and potassium chromate were studied. Filter paper sheets were accordingly prepared in which solutions of silver nitrate at concentrations of .175, .2, .225, and .25. Normality were reacted with solutions of potassium chromate of the same Normality (.175, .2, .225, and .25) in all possible combinations. All of the above proportions tested showed a visibly discernible brighter silver chloride precipitate at concentrations of .8 to .9% concentrations of sodium chloride or greater than at concentrations of .4 and .5% or less sodium chloride and therefore were amenable to use in this test. However, certain proportions resulted in a more vivid difference in intensity of silver chloride precipitate between the lower concentrations of sodium chloride and the physiological (ca. 0.85%) salt concentrations examined. The compositions providing these superior results were as follows:

NORMALITY OF SOLUTIONS

| Silver nitrate | Potassium chromate | Excess silver nitrate |
|---|---|---|
| .225 | .175 | .050 |
| .225 | .2 | .025 |
| .25 | .175 | .075 |
| .275 | .25 | .025 |
| .275 | .175 | .1 |

Experiments with nasal mucus and saliva indicated that the chloride test here described for cervical mucus is paralleled when secretions from the nasal mucosa or saliva are employed. Although the major experimental studies described herein were performed with cervical mucus, the invention described herein lends itself to use and interpretation with any female body fluid, the chloride ion concentration of which parallels that of the cervical mucus at any time of the normal menstrual cycle or abnormal variations thereof.

It is to be understood that the invention is not to be limited to the exact details of operation or exact compounds or compositions shown or described herein, as obvious modifications and equivalents will be apparent to one skilled in the art, and the invention is therefore to be limited only by the scope of the appended claims.

We claim:

1. A diagnostic test method for determining ovulatory function, which comprises withdrawing a sample of body fluid selected from the group consisting of cervical, nasal, and salivary mucus in which the chloride ion concentration is related to ovulatory function, and determining the chloride ion concentration of said body fluid as an indication of the state of the ovulatory function at that time.

2. A diagnostic test method for determining ovulatory function, which comprises withdrawing a sample of body fluid selected from the group consisting of cervical, nasal, and salivary mucus in which the chloride ion concentration is related to ovulatory function, determining the chloride ion concentration of said body fluid, and comparing the determined value for chloride ion concentration with a predetermined standard in which chloride ion concentration is correlated to ovulatory function.

3. A diagnostic test method for determining ovulatory function, which comprises withdrawing a sample of body fluid selected from the group consisting of cervical, nasal, and salivary mucus in which the chloride ion concentration is related to ovulatory function, applying said body fluid sample to a sheet bearing silver chromate so as to cause a reaction between the fluid sample and the silver chromate, and comparing the extent of white stain formation with a pre-determined standard in which the extent of white stain formation is correlated to ovulatory function.

4. The method of claim 3 in which an alginate swab is employed for procurement of a mucus sample and application thereof to a contrast medium.

5. The method of claim 4 wherein a calcium alginate swab is employed.

6. A diagnostic test method for determining ovulatory function, which comprises withdrawing a sample of cervical mucus, and determining the chloride ion concentration of said mucus as an indication of the state of the ovulatory function at that time.

7. A diagnostic test method for determining ovulatory function, which comprises withdrawing a sample of cervical mucus, determining the chloride ion concentration of said mucus, and comparing the determined value for chloride ion concentration with a predetermined standard in which chloride ion concentration is correlated to ovulatory function.

8. A diagnostic test method for determining ovulatory function, which comprises withdrawing a sample of cervical mucus, applying said mucus sample to a sheet bearing silver chromate so as to cause a reaction between the fluid sample and the silver chromate, and comparing the extent of white stain formation with a predetermined standard in which the extent of white stain formation is correlated to ovulatory function.

9. A diagnostic test method for determining ovulatory function, which comprises withdrawing a sample of nasal mucus, and determing the chloride ion concentration of said mucus as an indication of the state of the ovulatory function at that time.

10. A diagnostic test method for determining ovulatory function, which comprises withdrawing a sample of nasal mucus, determining the chloride ion concentration of said mucus, and comparing the determined value for chloride ion concentration with a predetermined standard in which chloride ion concentration is correlated to ovulatory function.

11. A diagnostic test method for determining ovulatory function, which comprises withdrawing a sample of nasal mucus, applying said mucus sample to a sheet bearing silver chromate so as to cause a reaction between the fluid sample and the silver chromate, and comparing the extent of white stain formation with a predetermined standard in which the extent of white stain formation is correlated to ovulatory function.

12. A diagnostic test method for determining ovulation period which comprises withdrawing periodic samples of a body fluid selected from the group consisting of cervical, nasal, and salivary mucus in which the chloride ion concentration is related to ovulatory function, and determining when the chloride ion concentration of said body fluid reaches a value of at least about .8% based on sodium chloride.

13. A diagnostic test method for determining ovulation period which comprises withdrawing periodic samples of a body fluid selected from the group consisting of cervical, nasal, and salivary mucus in which the chloride ion concentration is related to ovulatory function, determining the chloride ion concentration of the various samples of said body fluid, and determining as the ovulation period the period in which the chloride ion content takes a sudden rise.

14. The process of claim 13 wherein the body fluid is cervical mucus.

15. A diagnostic test method for determining ovulation period which comprises withdrawing periodic samples of a body fluid selected from the group consisting of cervical, nasal, and salivary mucus in which the chloride ion concentration is related to ovulatory function, determining the chloride ion concentration of the various samples of said body fluid, and determining as the ovulation period the period in which the chloride ion content takes a sudden rise to at least about .8% based on sodium chloride.

16. A diagnostic test method for determining ovulation period, which comprises withdrawing periodic samples of cervical mucus, applying said mucus samples to a sheet bearing silver chromate so as to cause a reaction between the fluid sample and the silver chromate, and determining when the extent of white stain formation when compared with a predetermined standard indicates a chloride ion content of at least about .8% based on sodium chloride.

References Cited

UNITED STATES PATENTS 2,676,874   4/1954   Devine _____ 23—230

OTHER REFERENCES

Abou-Shabanah, E. H., Plotz, E. J., Am. J. Obst. and Gynec., September 1957, pp. 559–568, vol. 74, No. 3.

Daniel, E. E., Hunt, J., Allan, D., Robinson, K., Chem. Abst. 54, 19911b, 1960. Original article in J. Am. Obstet. Gynecol. 79, pp. 417–427 1960.

Frank, H. A., Carr, M. H., J. Lab. and Clin. Med. 49, 1957, pp. 246–252.

MORRIS O. WOLK, *Primary Examiner.*

R. M. REESE, *Assistant Examiner.*

U.S. Cl. X.R.

167—74